United States Patent

Stoten

[15] 3,636,517
[45] Jan. 18, 1972

[54] METERING STATIONS

[72] Inventor: Terence Arthur Stoten, Luton, England
[73] Assignee: Kent Meters Limited, Luton, England
[22] Filed: Dec. 15, 1969
[21] Appl. No.: 885,096

[52] U.S. Cl............................................340/150, 340/203
[51] Int. Cl..........................................................G01d 4/00
[58] Field of Search...............................340/150, 203, 147

[56] References Cited

UNITED STATES PATENTS 3,388,388  6/1968  Brown....................................340/203
3,501,744  3/1970  Simjian..................................340/147

*Primary Examiner*—Donald J. Yusko
*Attorney*—Young & Thompson

[57] ABSTRACT

A meter station has a main counter displaying an all-time total mechanically coupled to drive a reversible counter the reading of which is also displayed. The drive is through a differential gear device incorporated in the first decade wheel of the reversible counter. Pulses supplied from and counted at a remote interrogator station reset the reversible counter by means of a solenoid lever mechanism. The pulse supply is stopped by a zero switch opened by the reversible counter when the decade wheels show between zero and minus one so that the lever mechanism will complete its last cycle even though the reversible counter is being driven by the main counter. In a modification, the solenoid lever mechanism and the counter at the interrogator station operate alternately in half-cycle steps so that the interrogation proceeds at the operating speed of the mechanism resetting reversible counter.

6 Claims, 4 Drawing Figures

INVENTOR
TERENCE ARTHUR STOTEN
BY Young + Thompson
ATTYS.

INVENTOR
TERENCE ARTHUR STOTEN
BY Young + Thompson
ATTYS.

METERING STATIONS

The invention relates to meter stations and in particular to meter stations adapted to be read remotely at an interrogator station from time to time.

Where a metered commodity, for example water, is consumed more or less continuously and the consumer is to be charged at intervals, for example monthly, it is convenient to arrange for reading of a meter for charging purposes from a point remote from the actual metering position, for example externally of the domestic or commercial building to which the commodity is supplied. Metering arrangements for this purpose can comprise a main or totalizing register on which is accumulated an all-time consumption total and an auxiliary register which can be emptied under remote control from time to time and which accumulates after each return to zero a short term total corresponding or proportional to what has been added to the total accumulated on the main register. It is an object of the present invention to provide an improved meter station for use in such an arrangement.

It is a further object of this invention to provide such a meter station in which the emptying of the reversible register can be completed regardless of whether there is an incoming addition to the total accumulated therein during the emptying operation.

It is a further object of the invention to provide such a meter station in which the totals stored by both the main and auxiliary registers are displayed, so that the consumer can be aware of both the long term consumption and the short term consumption since the last reading.

The invention accordingly provides a metering station, said station comprising a totalizing register, a reversible storage register, means for increasing the unit total of the reversible storage meter in dependence on increases in the unit total of the totalizing register, means operable to decrease the unit total of the reversible storage register unit by unit in response to an electrical signal supplied to the meter station from an interrogator station remotely situated therefrom, means for stopping the supply of the signal when the reversible storage meter total is reduced to a predetermined value, said means for decreasing the reversible storage meter total being adapted to operate independently of any increase of said total.

The invention also provides a meter station, said meter station comprising a totalizing register for accumulating and displaying a first unit total, a reversible storage register for accumulating and displaying a second unit total, means for increasing the second unit total in dependence on increases in the first unit total, means for effecting a decrease of the second unit total unit by unit in response to an electrical signal supplied to the station from an interrogator station situated remotely therefrom, and means for stopping the supply of said signal to the meter station when said second total reaches a predetermined value, whereby measurement of the signal at the interrogator station from the initiation to the stopping thereof provides at the interrogator station a total equal to the second unit total.

Embodiments of the invention are described below by way of illustration, with reference to the accompanying drawings, in which.

Figure 1:
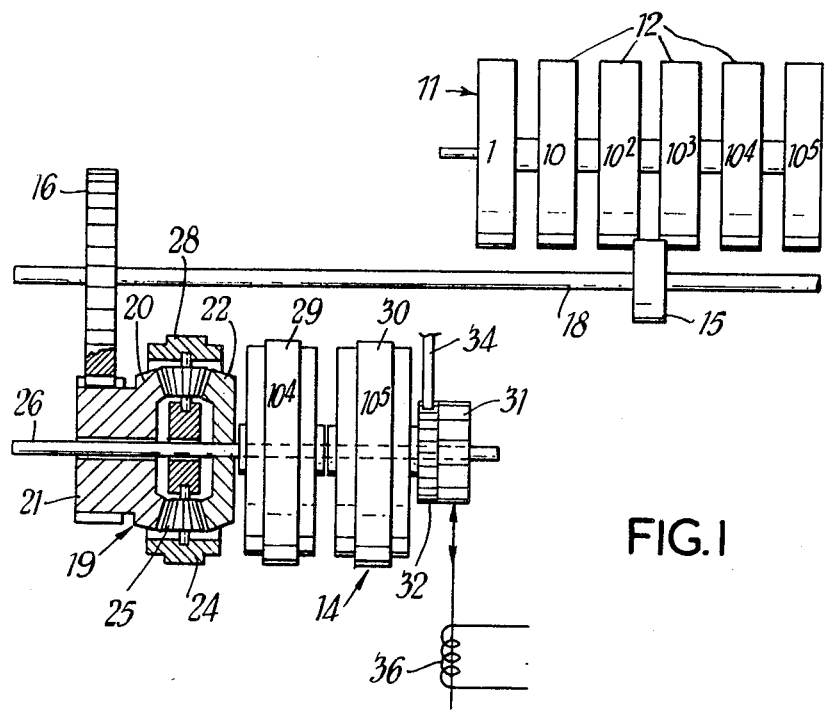
FIG. 1 shows partly in section and partly in schematic form a meter station including a totalizing register and a storage register.
Figure 2:
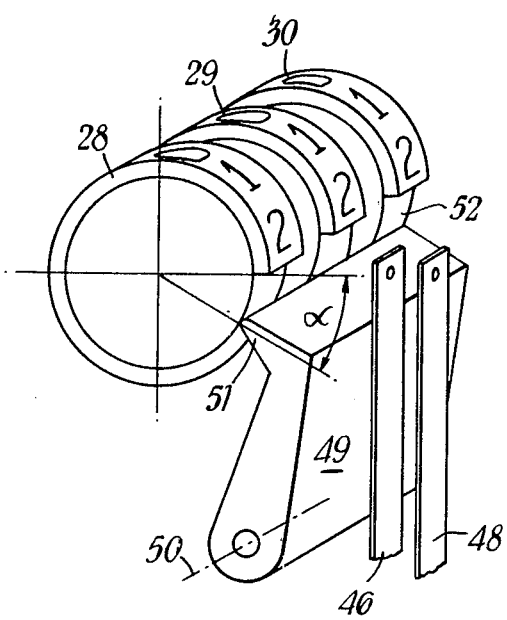
FIG. 2 is a partial perspective view of the storage register of FIG. 1.
Figure 3:
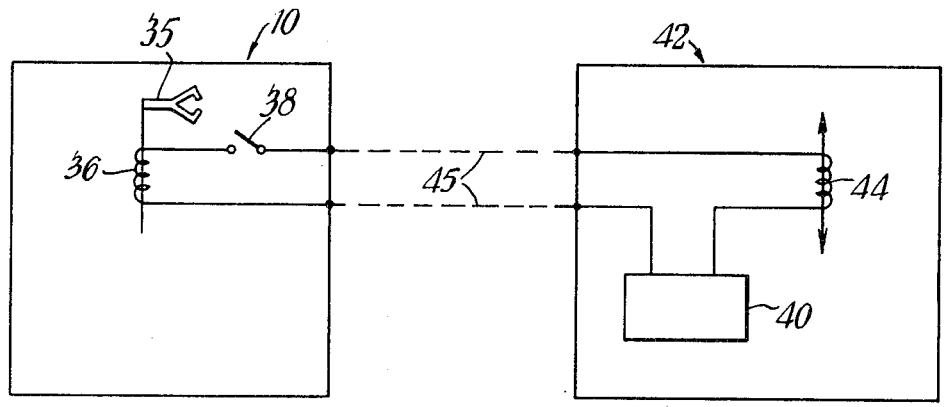
FIG. 3 is a partial schematic diagram of the meter station of FIGS. 1 and 2 and an interrogator station for cooperation therewith.

The meter station 10 illustrated in FIGS. 1, 2 and 3 includes a totalizing counter or register 11 comprising a plurality of decade wheels 12 accumulating an input and displaying the total in digital form. The total of the consumption units on the register 11 can be advanced in any appropriate way and may represent any desired value. A convenient but not exclusive application is the measurement of the quantity of a commodity, for example water, supplied to domestic or commercial premises.

A storage counter or register 14 at the meter station 10 is driven from the totalizing register 11 by means of a gear drive including gears 15 and 16 fast on a shaft 18, the gear 15 being driven directly from a selected one of the decade wheels 12 of the register 11 and the gear 16 driving one element of a differential gear arrangement 19. Specifically the gear 16 drives a crown wheel 20 of the differential gear arrangement by meshing with teeth on a drum portion 21 integral with the crown wheel. The other crown wheel 22 of the differential gear arrangement is secured on a shaft 26 which is rotated by means to be described when it is required to empty the storage register. A cage 24 constituting the intermediate differential gear element is freely rotatable on the shaft 26, as is the crown wheel 20, and rotatably mounts pinions 25 meshing with the crown wheels. The cage 24 has an external portion 28 formed as the first decade wheel of the storage register 14, the differential gear arrangement thus being incorporated within this wheel. The storage register has additional decade wheels 29 and 30 and can be driven from any selected decade wheel of the totalizer register 11 so as to operate if required in units larger than those of the totalizer register by a factor of 10, 100 etc. Whatever the denomination of the storage register, it will count in the same time as is required for a count of the smallest unit of the totalizer register.

When the meter station 10 is to be read, the shaft 26 of the storage register 11 is rotated electromechanically by means of a ratchet wheel 31, having a toothed portion 32 associated with an index spring 34, the wheel being driven by a lever 35 operated by a solenoid coil 36. The solenoid coil 36 is energized by a series of pulses supplied from an interrogator station 42 which may be located remotely from the meter station, the only connection required between the stations being the two wires 45, as shown in FIG. 3. The pulses are supplied to the coil 36 through a zero switch 38 at the meter stations from a pulse generator 40 at the interrogator station. An electromechanical counter 44 is provided at the interrogator station 42 for recording the pulses required to empty or reset the storage register. The end of the resetting operation is signalled by the opening of the zero switch 38.

In operation, the counter or register 44 is set at zero and the interrogator station 42 is connected to the meter station 10.

Pulses from the pulse generator 40 are supplied on the wires 45 either by energizing the generator or by connecting the energized operating generator into the circuit by a switch (not shown). The zero switch 38 is closed, as will be later explained, provided the storage register total is not zero, and the pulses therefore effect resetting of the storage register. The zero switch 30 will open when the storage register 14 reaches zero to stop the supply of pulses of the counter 44 will at that time have reproduced the total shown on the storage register at the start of the reading operation.

To avoid the possible loss of a counter unit applied to the storage register 14 during the resetting of the register, the zero switch 38 is arranged to open not as the decade wheels 28, 29, 30 reach zero but when these wheels show between zero and minus one unit.

As shown in FIG. 2, the zero switch 38 comprises two switch blades 46, 48 operated by a cam member 49 pivoted on an axis 50 and having a cam follower portion 51 urged into engagement with the surfaces of the decade wheels 28, 29 and 30 either by the resilience of the blade 46 or by separate spring means (not shown). The cam follower portion 51 is angularly spaced from the decade digital display position corresponding to the zero position, by 90°, and the decade wheels 28, 29 30 are all provided with a cam surface recess over a peripheral portion 52 subtending an angle and equal to 36° and corresponding to the "4" digit. It will be seen that the follower portion 51 will fall into the recessed portion 52, and allow the zero switch blades 46, 48 to open, after the decade wheels have just been driven past the zero mark by the solenoid operated lever 35.

This arrangement allows the lever 35 to complete its last cycle even if this occurs as the storage register 14 is being driven by the totalizing register 10. As the input of a measured unit takes place during the last fractional part of the consumption represented by that unit, the excess recorded at the interrogator counter will be less than that part. The error can be made insignificant by appropriate design and will in any event normally be quickly cleared by further consumption.

It will be evident that a mechanical failure of either one of the meter registers 11, 14 or of the interrogator counter 44 in the apparatus of FIGS. 1 to 3 will not prevent the other from continuing to work.

The speed with which the mechanical operations of interrogation can be performed will of course depend on the type, and to some extent on the age, of the components employed. The frequency of the pulse generator at the interrogator station has be to selected to deal safely with the slowest acting components. Shorter interrogation times can be achieved by making the interrogator arrangements operate at a speed dependent on the operating speed of the components. A way of doing this is shown in FIG. 4.

Figure 4:
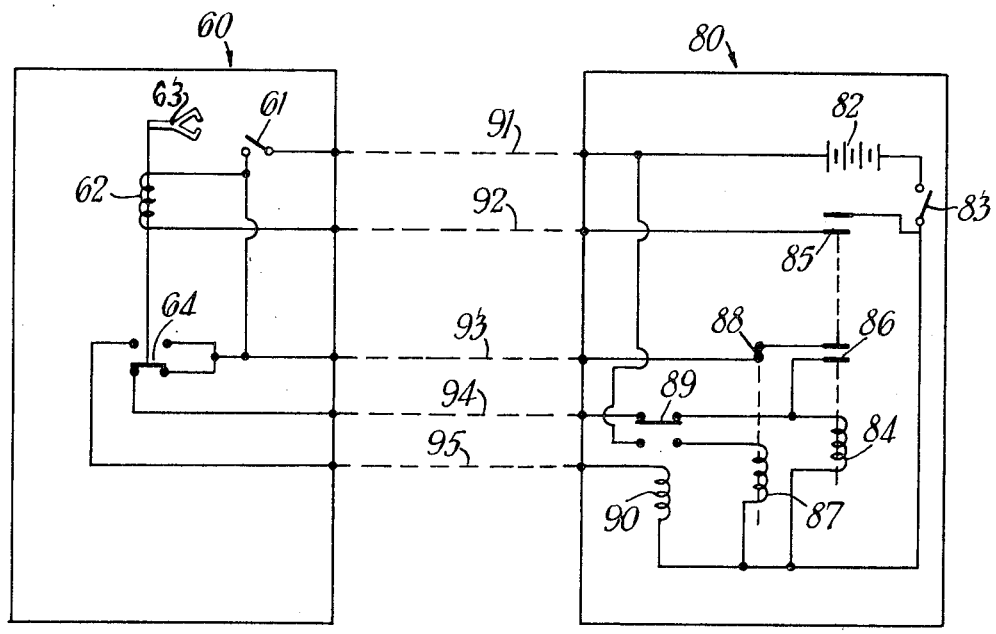
FIG. 4 is a circuit drawing of a second form of meter station embodying the invention and of a modified interrogator station for cooperation therewith.

In the embodiment of FIG. 4, a meter station 60 can be read at a remote interrogator station 80 when connection is established through five wires 91 through 95.

The meter station 60 includes totalizing and storage registers preferably corresponding to those described in connection with FIGS. 1 and 2. The storage register is emptied similarly by a lever 63 operated by a solenoid coil 62 supplied by pulses which are stopped by the opening of a zero switch 61, preferably in the manner described in connection with the zero switch 38. The meter station also includes a register extremity switch 64.

The remote interrogator station 80 includes a source of direct current, shown as a battery 82, a readout switch 83, a first relay having a coil 84 and two sets of normally open contacts 85 and 86, a second relay having a coil 87 and a set of normally closed contacts 88, an interrogator extremity switch 89, and an electromechanical counter 90 which can correspond to the counter or register 44 of FIG. 3.

In FIG. 4 the relay contact sets 85, 86 and 88 and the extremity switches 64 and 89 are shown in deenergized positions, i.e., with the readout switch 83 open (as shown) and the battery 82 isolated. These positions are those adopted when the meter storage register 60 is not under interrogation.

The manner in which the totalizing register of the station 60 is interrogated is as follows. The readout switch 83 is closed and, assuming the zero switch 61 is also closed, the first relay coil 84 is energized by the battery 82 via conductor 91, zero switch 61, register extremity switch 64, conductor 94 and interrogator extremity switch 89. The two sets of contacts 85 and 86 thus go from their normally open to closed positions. Closure of the contact set 86 latches the first relay by providing a second source of energizing current for the coil 84, via conductor 93 and the closed set of contacts 88 of the second relay. Closure of the other set of contacts 85 energizes the solenoid coil 62 via conductors 91 and 92, causing the solenoid lever mechanism 63 to operate through one half cycle or half count.

Such movement of the solenoid lever mechanism 63 moves the register extremity switch 64 from the position shown in FIG. 4 to the alternative position, thus interrupting the first supply of current to the relay coil 84 via conductor 94, but not interrupting the latching supply via conductor 93. It also applies the battery voltage via conductor 95 to the coil 90, thus causing the counter to count on half count.

Actuation of the coil of the counter 90 causes the interrogator extremity switch 89 to move from the position shown in FIG. 4 to the alternative position. This movement removes the current supply to the relay coil 84 via conductor 94, and energizes relay coil 87, thus causing the normally closed contacts 88 to be opened, and the latching current supply to the relay coil 84 also to be broken.

The circuit is then restored to its original condition, the deenergization of the relay coil 84 causing the set of contacts 85 to break, thus deenergizing the solenoid coil 62 and causing the register extremity switch 64 to return to the position shown in FIG. 4, in which the coil of the counter 90 is deenergized, so that the second half count is effected, and the relay coil 84 is energized again.

As long as the readout switch 83 is kept closed, the pulses to the counter coil 90 will continue under the control of the solenoid movement until the zero switch 61 is opened, as described in connection with FIGS. 1 to 3.

In any embodiment of the invention, safety features, such as signal lamps and means for interlocking the counter readout and reset, can be provided at the interrogator station. The invention can be applied for example to the reading of domestic service meters, such as gas, water or electricity meters, either from the outside of the dwelling in which they are installed, or from more remote locations. In such applications, a consumer able to inspect the storage register is provided with information about consumption since the last reading of the meter, and a charge for service consumed can be prepared directly from the information provided by the meter at the interrogator station. However, the invention can be applied also to the remote reading of counters in any other appropriate context. The information obtained at the interrogator station can of course be recorded and/or displayed in any desired way.

I claim:

1. A metering station, said metering station comprising a first decade counter adapted to accumulate and display a first unit total, a second, reversible, decade counter adapted to accumulate and display a second unit total, mechanical drive means for increasing the second unit total in accordance with increases in the first unit total, electromechanical means for effecting a decrease of the second unit total unit by unit in response to an electrical signal supplied to the metering station from an interrogator station situated remotely therefrom, said mechanical drive means including a differential gear arrangement, the three elements of the differential gear arrangement being connected respectively to the first and second decade counters and to the electromechanical means, and switch means for stopping the supply of said signal to the metering station when said second decade counter reads between zero and minus one, whereby said electromechanical means can complete a unit decrease of the second unit total independently of an increase therein and whereby measurement of the signal at the interrogator station from the initiation to the stopping thereof provides at the interrogator station a total equal to the second unit total.

2. A metering station as claimed in claim 1, in which said differential gear arrangement is located within the decade wheel of lowest denomination of the plurality of decade wheels of said second decade counter.

3. A metering station as claimed in claim 1, having a cam for actuating said switch means, said cam having a follower portion urged to engage the wheels of said second decade counter at a position angularly spaced from the display position of said wheels, the wheels each having a cam surface for moving the cam to actuate the switch means at a position spaced from a zero mark on said surfaces.

4. A metering station as claimed in claim 1, having remotely connected thereto an interrogator station including a source of electrical pulse train constituting the electrical signal.

5. A metering station as claimed in claim 4, having means in the interrogator station for generating each successive pulse of the electrical pulse train in response to the unit decrease of the storage register total by the previous pulse.

6. A metering station as claimed in claim 4, having in the interrogator station an electromechanical counter, and means including cooperating switch means in said metering station and in said interrogator station adapted to effect operation of the counter and the electromechanical means alternately in half count steps.